July 19, 1949.     R. J. SEARS     2,476,774
PROCESS FOR PRESERVING GARLIC
Filed Feb. 26, 1947

RALPH J. SEARS
INVENTOR.

BY
G. Lorenze Miller

Patented July 19, 1949

2,476,774

UNITED STATES PATENT OFFICE 2,476,774

PROCESS FOR PRESERVING GARLIC

Ralph J. Sears, Anderson, Ind.

Application February 26, 1947, Serial No. 730,967

2 Claims. (Cl. 99—168)

My invention relates to garlic preserving and comprises a process for preserving garlic in small packages for retail merchandising so that for a long period of time it may be kept in stores without danger of germination, evaporation, contamination or other kinds of deterioration which may result from exposure to the atmosphere.

Although I am aware that various food products have been treated with paraffin, such treatment has not, so as I am informed, been applied to the preservation of garlic, and prior to the development of my process, garlic has been an unprofitable commodity in the retail market because of deterioration resulting from germination and evaporation, especially during the spring months.

Besides the losses to the merchant from the causes mentioned, the odor of garlic, which is offensive to many people, has discouraged retail merchants from selling it. When treated according to my process all garlic odor is excluded from any place where it is stored.

Other objects of my invention will appear from the following description taken in connection with the accompanying drawings in which.

Figure 1:
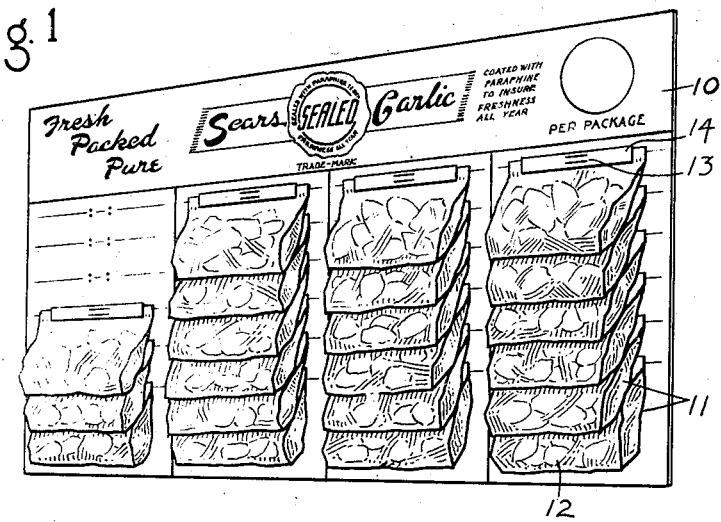
Fig. 1 is a perspective view of my display board having attached thereto a number of sealed packages of garlic.
Figure 2:
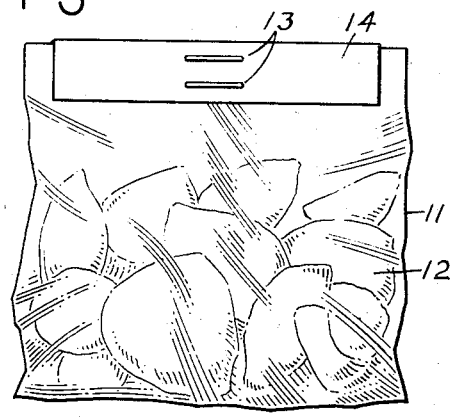
Fig. 2 is a front view of one of the packages shown in Fig. 1.
Figure 4:
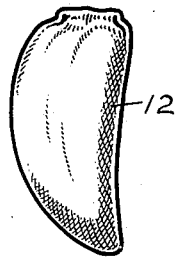
Fig. 4 is a side view of one of my coated garlic beans or bulbs.
Figure 3:
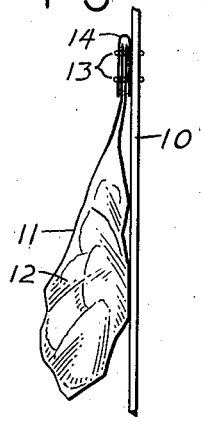
Fig. 3 is an end view of my display stand showing the manner of attaching one of the sealed packages.
Figure 5:
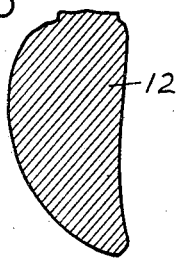
Fig. 5 is a sectional view of the garlic bean shown in Fig. 4.

In the drawings in which like numerals designate like parts, the broad object of my invention is to place small quantities of garlic, which has been treated to insure its preservation and freedom from odor in convenient condition for retail merchandising and pursuant to that object I have provided a card-board stand 10 to which several rows of transparent envelopes 11 containing preserved garlic beans 12 are attached by means of staples 13, which project through the folded stiffener 14 and also through the upper edges of the envelopes 11 so that all dust is excluded and the garlic beans maintained in a sanitary and attractive condition.

In the development of my process of preserving garlic, I found that the first essential step was to break the whole garlic pods apart so that each bean could be carried separately, although in quantities with others, in a receptacle, and then brought to a temperature of 80° to 85° F., after which a quantity of the beans is immersed in melted paraffin and each separate bean coated therewith over its entire surface.

I have found that a very effective procedure is to place a quantity of garlic beans in a wire basket and immerse the beans in a hot water bath at a temperature of approximately 145° F. during a relatively short period, and immediately after removing the beans from this bath place them in a refrigerator for approximately five minutes at a temperature of 45° to 50° F., which brings the peel or skin down to an even temperature but allows the inside of the bean to remain warm. Then, the basket full of garlic beans is immediately immersed in liquid paraffin which has been heated to a temperature of approximately 160° F., which allows the paraffin to flow freely. The basket is then immediately removed from the liquid paraffin and kept in an agitating motion so that the garlic beans will not freeze or cling together in one large mass. Within a few seconds the paraffin will congeal on the separate beans and they are then spilled onto a table.

The agitation of the beans spreads the paraffin smoothly over each bean. Although the agitation may spread the paraffin more thickly in some places than others this method insures that there will be no uncovered areas on any of the beans. Thus the meat of the bean is completely sealed away from the atmosphere and it cannot germinate, mold or deteriorate in any other manner, and no odor can escape from the bean into the atmosphere.

After the operations just described have been completed, the garlic beans are graded and selected and placed in the transparent envelopes 11 to further seal them away and protect them from any type of contamination that they might accumulate before they reach the markets or the consumer.

Garlic beans treated and packaged in accordance with my improved preserving process have been kept two and one-half years at ordinary room temperature before any signs of deterioration appeared, and without any germination whatsoever.

Not only does my improved preserving process maintain the original good quality of the garlic over a long period of time, but it also places it on the retail market in an attractive and sanitary manner.

It should be understood that the moderate heating of the beans and the even temperature of the peel or skin of the garlic beans are important in that this governs the thickness or consistency of paraffin which the beans will pick up when immersed therein. If the beans are cold they will pick up too thick a coating, and when too warm, they will have too thin a coating.

It should also be understood that the temperatures mentioned in the foregoing description may vary a few degrees either way without materially affecting the beneficial results of the process.

The skin and paraffin of each coated bean can be very readily removed with a paring knife thus rendering fresh garlic available at any time for the many purposes for which it is used.

Having described my invention, I claim:

1. The process of individually coating a collected group of garlic beans to preserve the same comprising the following steps: first separating the beans from a garlic pod so as to leave the skin on the individual beans, then collecting the thus separated groups of beans and immersing the collected beans in a water bath having a temperature of approximately 145° to thereby increase the temperature of the bean and the skin covering over each individual bean, then removing the beans from the water bath, then subjecting the beans to a temperature of approximately 45° to 50° F. for a period of approximately five minutes calculated to selectively cool the skin while maintaining the enclosed bean warm, then immersing the container in a bath of liquid paraffin to coat the beans, and then agitating the beans to maintain them separated as individual beans while cooling the paraffin coating prior to packaging the same as a final product.

2. The process of individually coating a collected group of garlic beans to preserve the same comprising the following steps; first removing the garlic pod from each group of garlic beans therein so as to leave the individually separated beans and heating the same to raise the temperature of the beans to approximately 80° to 85° F., skin and all, then cooling the beans by subjecting the beans to a temperature of from 45° to 50° F. whereby the skin is cooled while maintaining the interior bean warm, then immersing the thus cooled beans in hot liquid paraffin and agitating the beans while the paraffin is cooling and hardening to form a coating around the skin of each individual bean.

RALPH J. SEARS.

REFERENCES CITED

The following references are of record in the file of this patent:

UNITED STATES PATENTS

| Number | Name | Date |
| --- | --- | --- |
| 45,762 | Staunton | Jan. 3, 1865 |
| 222,427 | Snow | Dec. 9, 1879 |
| 984,334 | Wilkins | Feb. 14, 1911 |
| 1,795,153 | Thompson | Mar. 3, 1931 |
| 1,895,102 | Mayhew | Jan. 24, 1933 |
| 1,940,078 | Cooper | Dec. 19, 1933 |
| 2,224,942 | Weisman | Dec. 17, 1940 |
| 2,373,521 | Wigelsworth | Apr. 10, 1945 |
| 2,437,859 | Moulthrop | Nov. 16, 1948 |

OTHER REFERENCES

"The Freezing Preservation of Foods," by Tressler et al., 1947 ed., p. 441, lines 9–13. The Avi Publishing Co., Inc., N. Y., publishers.